United States Patent
Sullivan et al.

(10) Patent No.: US 9,959,011 B2
(45) Date of Patent: May 1, 2018

(54) METHODS, APPARATUSES, AND COMPUTER PROGRAM PRODUCTS FOR QUANTIFYING A SUBJECTIVE EXPERIENCE

(71) Applicant: Viizbi, Inc., Charleston, SC (US)

(72) Inventors: Brian Kenneth Sullivan, Charleston, SC (US); Corley Anne Higgins, Charleston, SC (US)

(73) Assignee: VIZBII TECHNOLOGIES, INC., Charleston, SC (US)

( * ) Notice: Subject to any disclaimer, the term of this patent is extended or adjusted under 35 U.S.C. 154(b) by 201 days.

(21) Appl. No.: 13/966,914

(22) Filed: Aug. 14, 2013

(65) Prior Publication Data

US 2015/0052461 A1    Feb. 19, 2015

(51) Int. Cl.
*G06F 3/048* (2013.01)
*G06F 3/0481* (2013.01)
*G06F 3/0484* (2013.01)
*G06T 11/60* (2006.01)

(52) U.S. Cl.
CPC ...... *G06F 3/04817* (2013.01); *G06F 3/04845* (2013.01); *G06F 3/04847* (2013.01); *G06T 11/60* (2013.01)

(58) Field of Classification Search
CPC ............. G06F 3/04842; G06F 3/04847; G06F 3/04817; G06F 3/04845; G06T 11/60
See application file for complete search history.

(56) References Cited

U.S. PATENT DOCUMENTS

| | | | | |
|---|---|---|---|---|
| 6,459,439 | B1 * | 10/2002 | Ahlquist, Jr. | G06T 11/203 345/619 |
| 2002/0149611 | A1 * | 10/2002 | May | 345/706 |
| 2008/0091635 | A1 | 4/2008 | James et al. | |
| 2009/0193344 | A1 * | 7/2009 | Smyers | 715/753 |
| 2010/0039400 | A1 * | 2/2010 | Jang | G06F 3/0485 345/173 |
| 2010/0287154 | A1 * | 11/2010 | Tee | G06F 3/0488 707/708 |
| 2011/0296324 | A1 * | 12/2011 | Goossens | G06Q 10/10 715/763 |
| 2012/0059787 | A1 * | 3/2012 | Brown et al. | 706/52 |
| 2014/0358773 | A1 * | 12/2014 | Lerner | G06Q 40/00 705/39 |

* cited by examiner

*Primary Examiner* — Kieu Vu
*Assistant Examiner* — Asteway T Gattew
(74) *Attorney, Agent, or Firm* — Womble Bond Dickinson (US) LLP

(57) ABSTRACT

The present disclosure relates to quantification of subjective experiences. A method for quantifying a subjective experience may include outputting an adjustable graphic that is continuously adjustable between differing states. The position of a selector may be manipulated to cause the adjustable graphic to be substantially simultaneously manipulated between the differing states to produce an adjusted graphic. Thus, a user may match the adjustable graphic to his or her subjective experience regarding a particular topic. The position of the adjustable graphic may be stationary, and thus independent of the position of the selector. A scaled value corresponding to the adjusted graphic may be calculated to quantify the subjective experience.

24 Claims, 13 Drawing Sheets

METHODS, APPARATUSES, AND COMPUTER PROGRAM PRODUCTS FOR QUANTIFYING A SUBJECTIVE EXPERIENCE

FIELD OF THE DISCLOSURE

The present disclosure relates to quantifying subjective experiences, and more particularly to methods, apparatuses, and computer program products for quantifying subjective experiences. The subjective experiences may be quantified by adjustment of an adjustable graphic.

BACKGROUND

Emoticons and other graphics have been employed in the past to express feelings and emotions. Traditionally emoticons have been employed to represent a user's current emotional state. By reducing a user's emotional state to a representative form, as expressed by the emoticon, a subjective experience may be expressed in a form that can be shared and compared. However, a graphical representation of a subjective experience may not be easily processed, for example by comparison to other subjective experiences.

Thus, it may be desirable to quantify subjective experiences. As may be understood, quantifying subjective experiences presents challenges. In this regard, it is difficult to make comparisons between two or more subjective experiences when the subjective experiences are not quantified in the same manner. Accordingly, advances with respect to quantifying subjective experiences may be desirable.

BRIEF SUMMARY OF THE DISCLOSURE

In one aspect a method for quantifying a subjective experience is provided. The method may include providing for output of an adjustable graphic, the adjustable graphic being continuously adjustable between at least two differing states. Further, the method may include providing for manipulation of a position of a selector, the position of the selector being independent of a position of the adjustable graphic. The method may also include substantially simultaneously adjusting the adjustable graphic between the differing states during manipulation of the position of the selector to produce an adjusted graphic via a processor. Additionally, the method may include determining a scaled value corresponding to the adjusted graphic selected.

In some embodiments the method may further include providing for selection of the adjustable graphic. Providing for selection of the adjustable graphic may include providing for selection of at least two vector graphics defining the at least two differing states. Additionally, the method may include providing for compilation of at least one of the scaled value and the adjusted graphic with at least one of a plurality of other scaled values and a plurality of other adjusted graphics selected by a plurality of additional users to produce a compiled data set.

In some embodiments the method may also include providing for distribution of the compiled data set. Adjusting the adjustable graphic may include manipulating a vector. The method may additionally include providing for output of a legend explaining a relationship between the position of the selector and the differing states of the adjustable graphic.

In another aspect an apparatus including at least one processor and at least one memory device with computer program code is provided. The at least one memory device and the computer program code may be configured to, with the processor, cause the apparatus to provide for output of an adjustable graphic, the adjustable graphic being continuously adjustable between at least two differing states, provide for manipulation of a position of a selector, the position of the selector being independent of a position of the adjustable graphic, substantially simultaneously adjust the adjustable graphic between the differing states during manipulation of the position of the selector to produce an adjusted graphic, and determine a scaled value corresponding to the adjusted graphic selected.

In some embodiments the apparatus may be further configured to provide for selection of the adjustable graphic. The apparatus may also be configured to provide for selection of the adjustable graphic by providing for selection of at least two vector graphics defining the at least two differing states. The apparatus may additionally be configured to provide for compilation of at least one of the scaled value and the adjusted graphic with at least one of a plurality of other scaled values and a plurality of other adjusted graphics selected by a plurality of additional users to produce a compiled data set.

In some embodiments the apparatus may be further configured to provide for distribution of the compiled data set. The apparatus may also be configured to adjust the adjustable graphic by manipulating a vector. Additionally, the apparatus may be configured to provide for output of a legend explaining a relationship between the position of the selector and the differing states of the adjustable graphic.

In an additional aspect, a computer program product including at least one computer-readable storage medium having computer-executable program code portions stored therein is provided. The computer-executable program code portions may include program code instructions providing for output of an adjustable graphic, the adjustable graphic being continuously adjustable between at least two differing states, program code instructions providing for manipulation of a position of a selector, the position of the selector being independent of a position of the adjustable graphic, program code instructions for substantially simultaneously adjusting the adjustable graphic between the differing states during manipulation of the position of the selector to produce an adjusted graphic, and program code instructions for determining a scaled value corresponding to the adjusted graphic selected.

In some embodiments the computer program product may further include program code instructions providing for selection of the adjustable graphic. Additionally, the computer program product may include program code instructions providing for selection of the adjustable graphic include program code instructions providing for selection of at least two vector graphics defining the at least two differing states. The computer program product may also include program code instructions providing for compilation of at least one of the scaled value and the adjusted graphic with at least one of a plurality of other scaled values and a plurality of other adjusted graphics selected by a plurality of additional users to produce a compiled data set.

In some embodiments the computer program product may further include program code instructions providing for distribution of the compiled data set. Program code instructions for adjusting the adjustable graphic may include program code instructions for manipulating a vector. The computer program product may additionally include program code instructions providing for output of a legend explaining a relationship between the position of the selector and the differing states of the adjustable graphic.

BRIEF DESCRIPTION OF THE FIGURES

Figure 1:
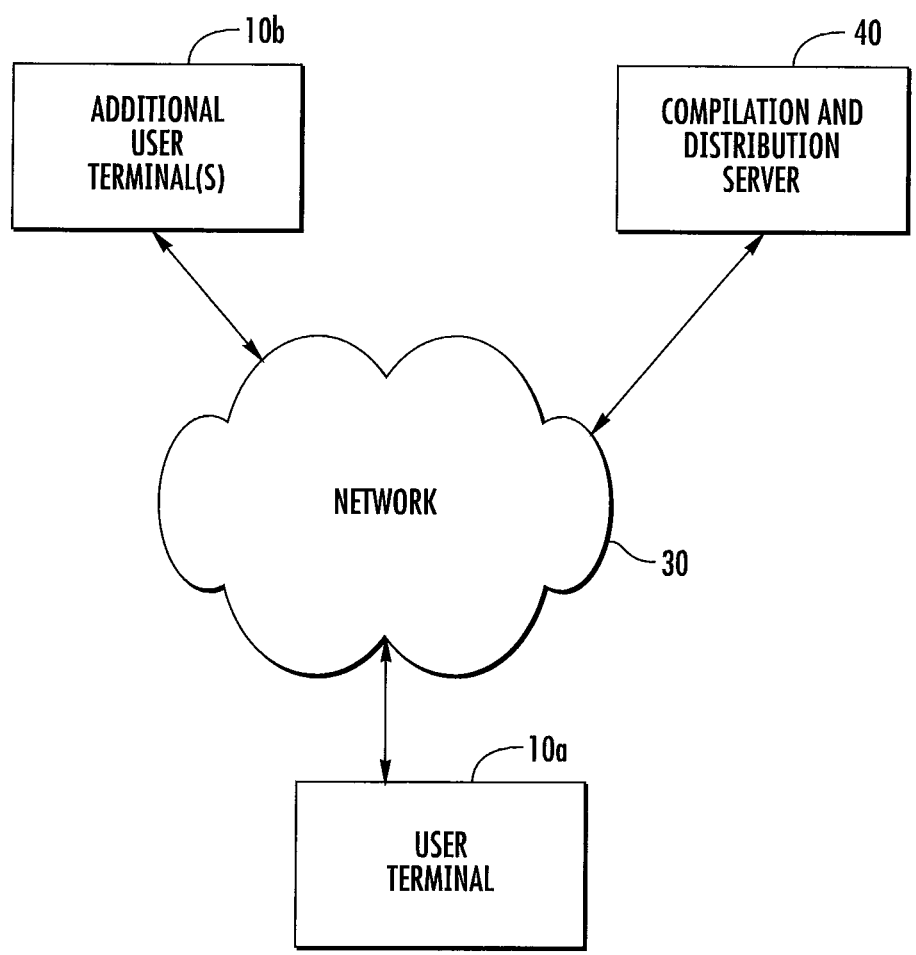
Figure 2:
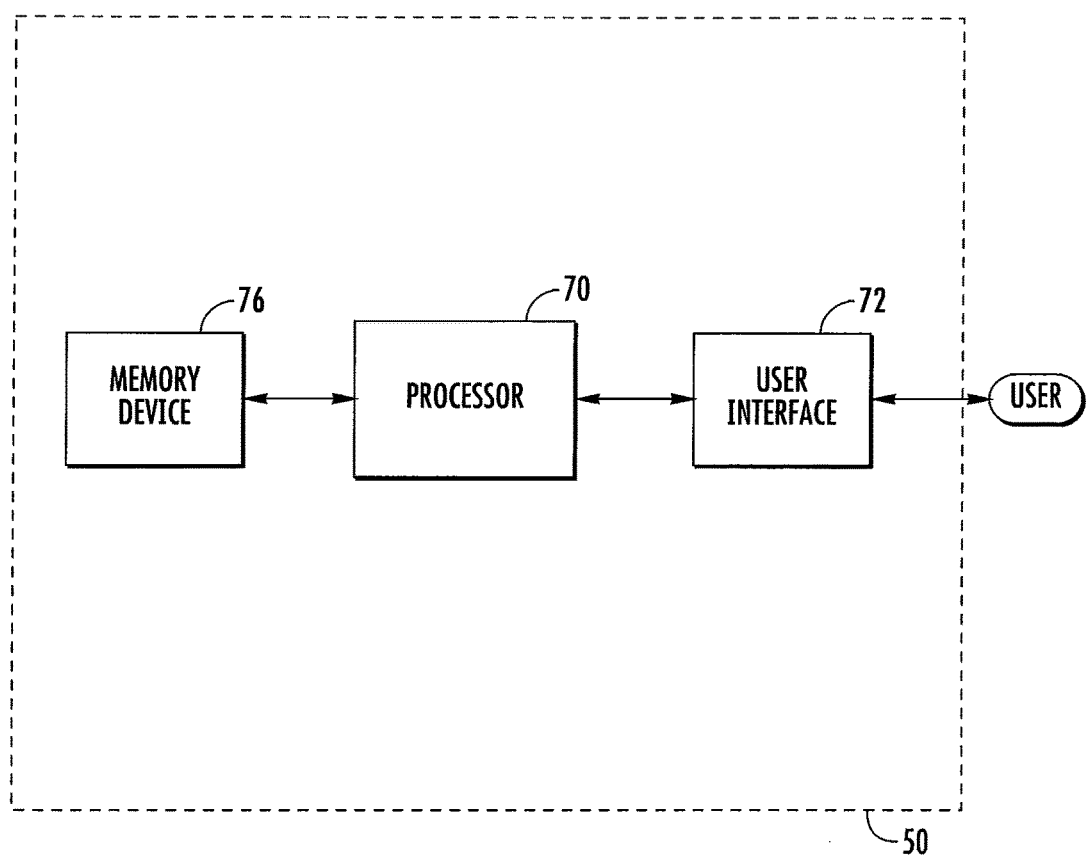
Figure 3:
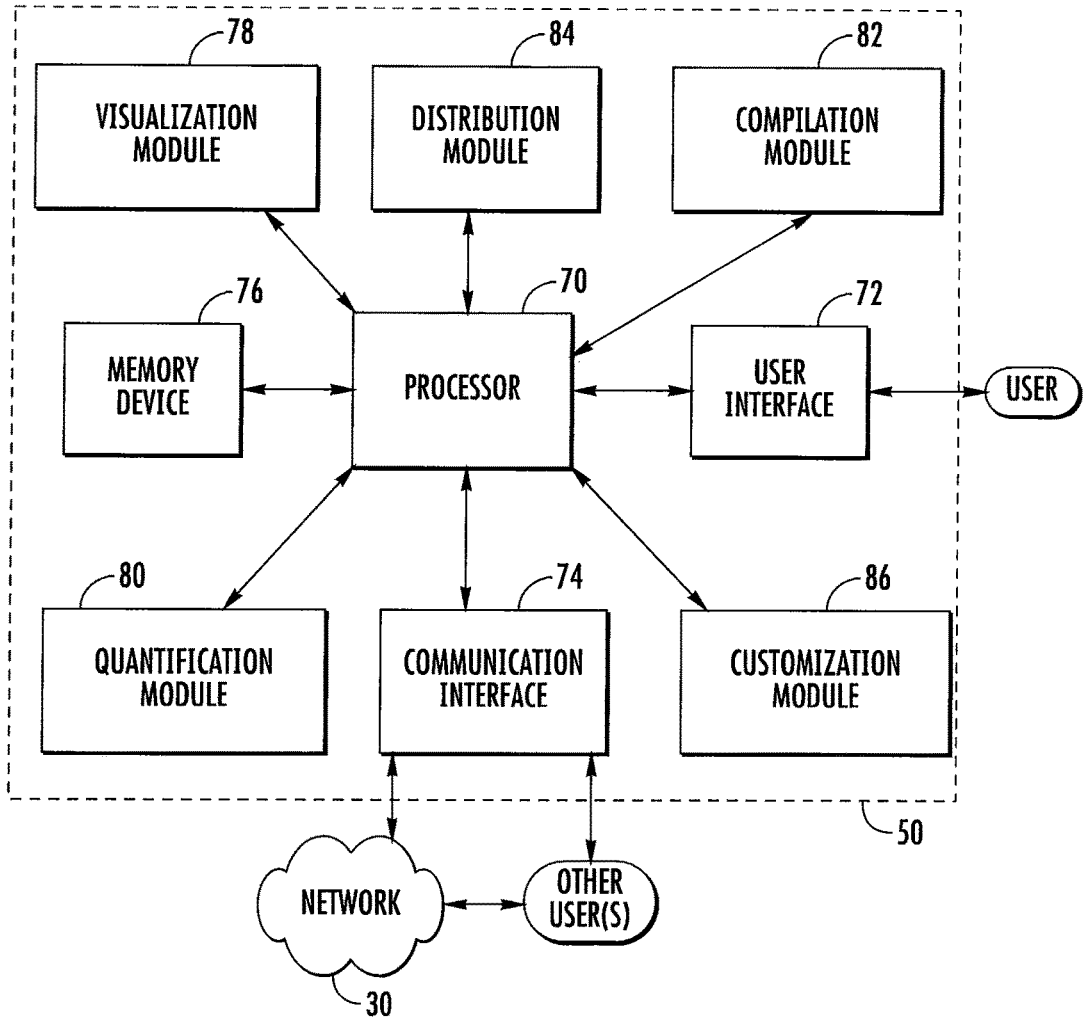
Figure 4:
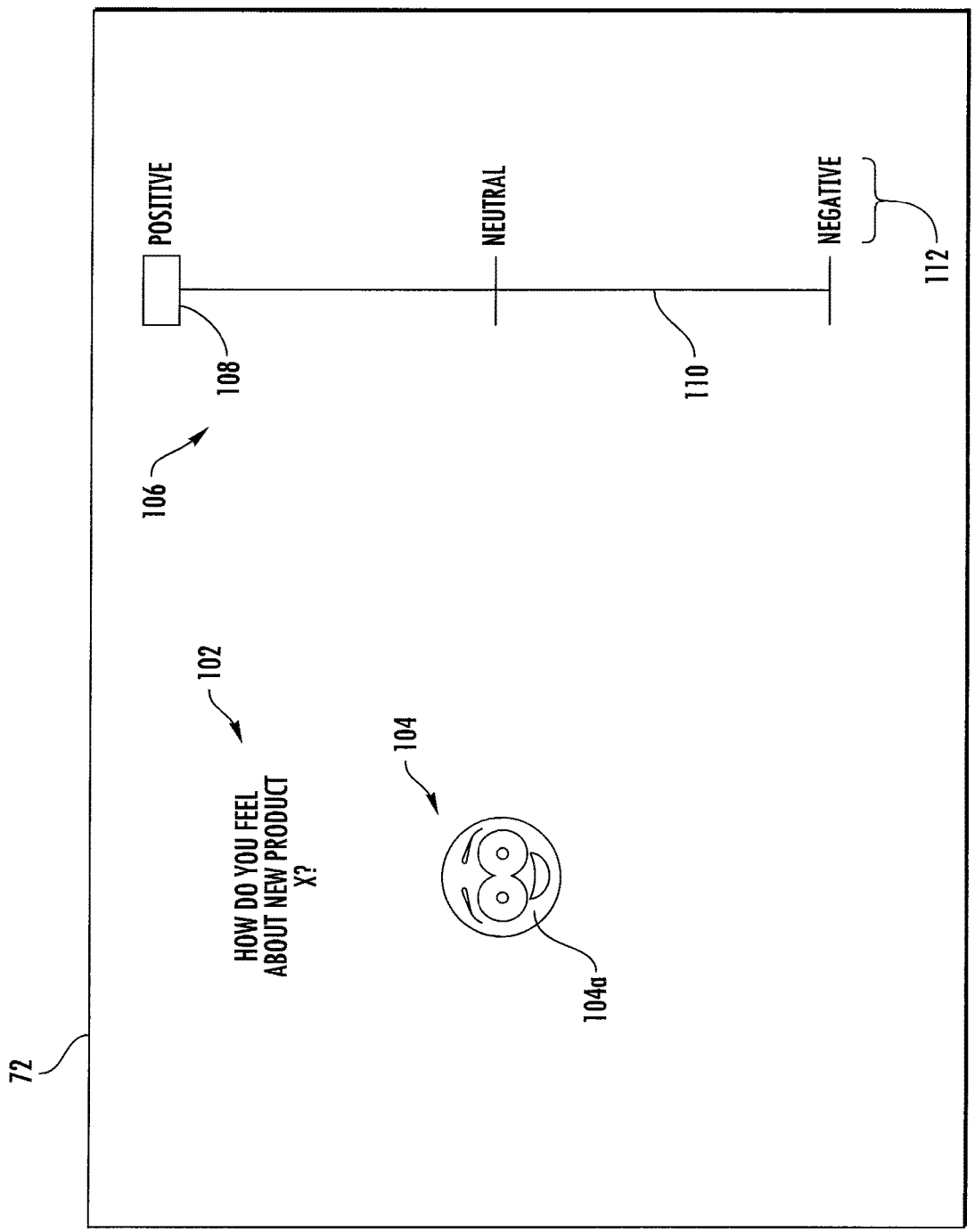
Figure 5:
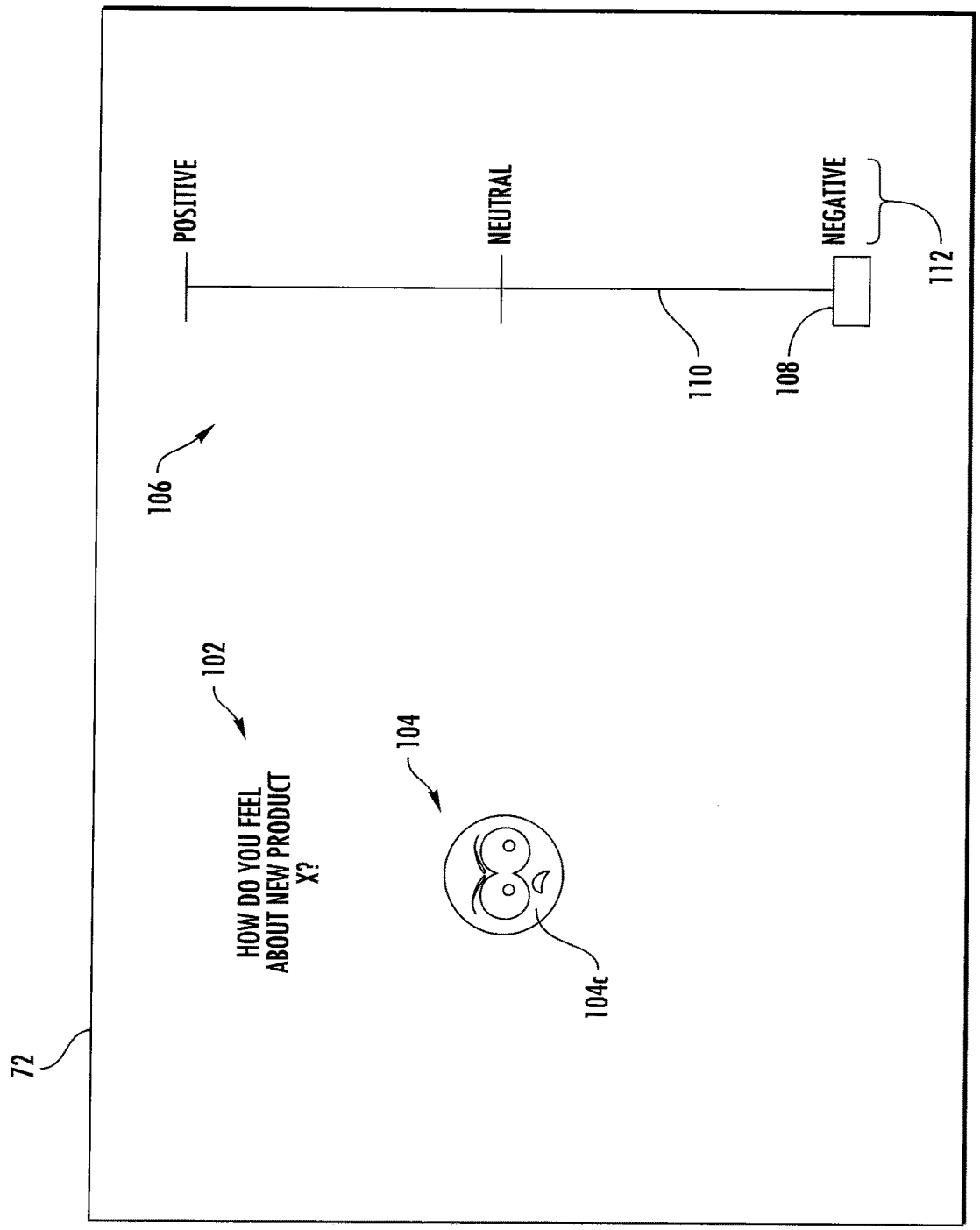
Figure 6:
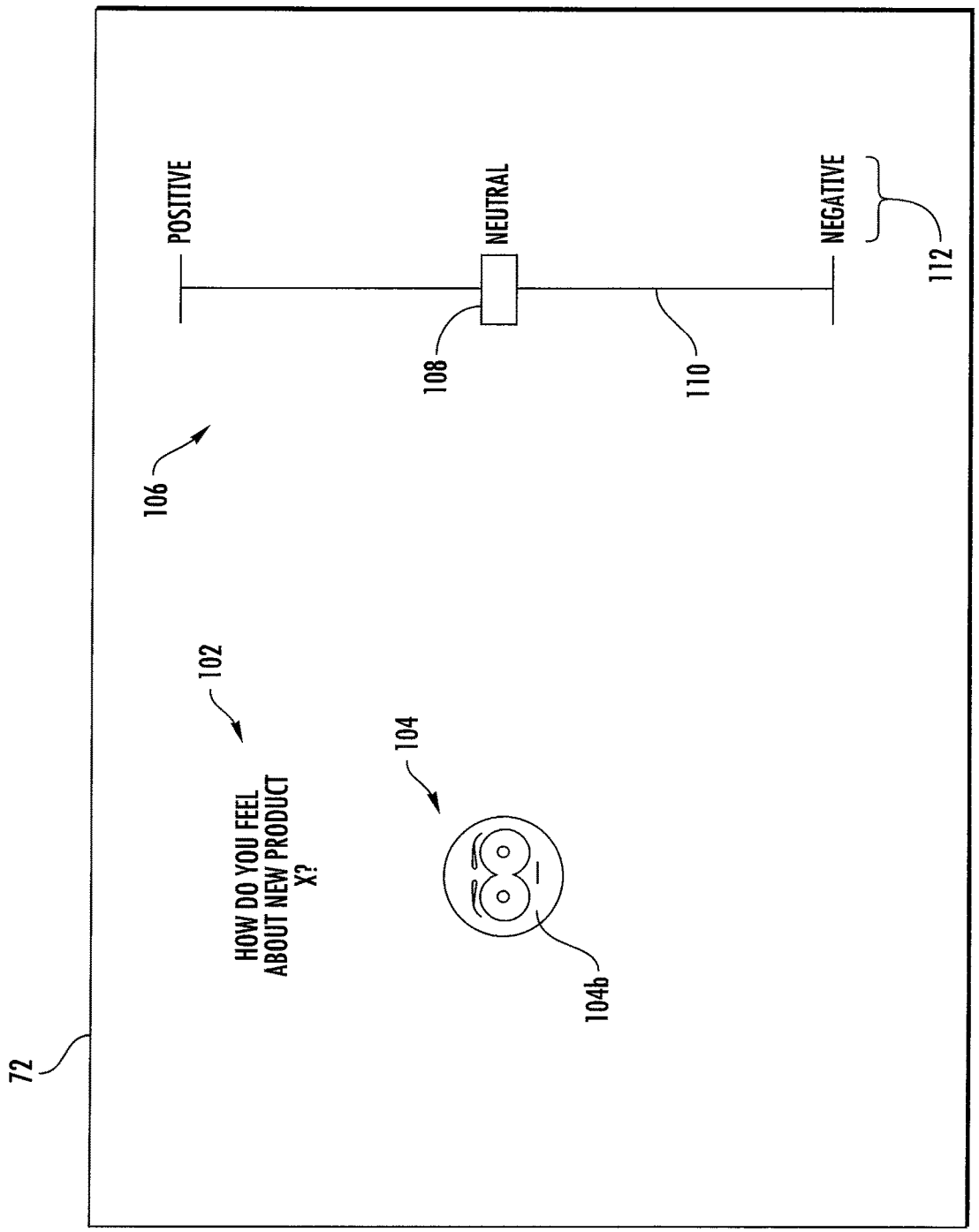
Figure 7:
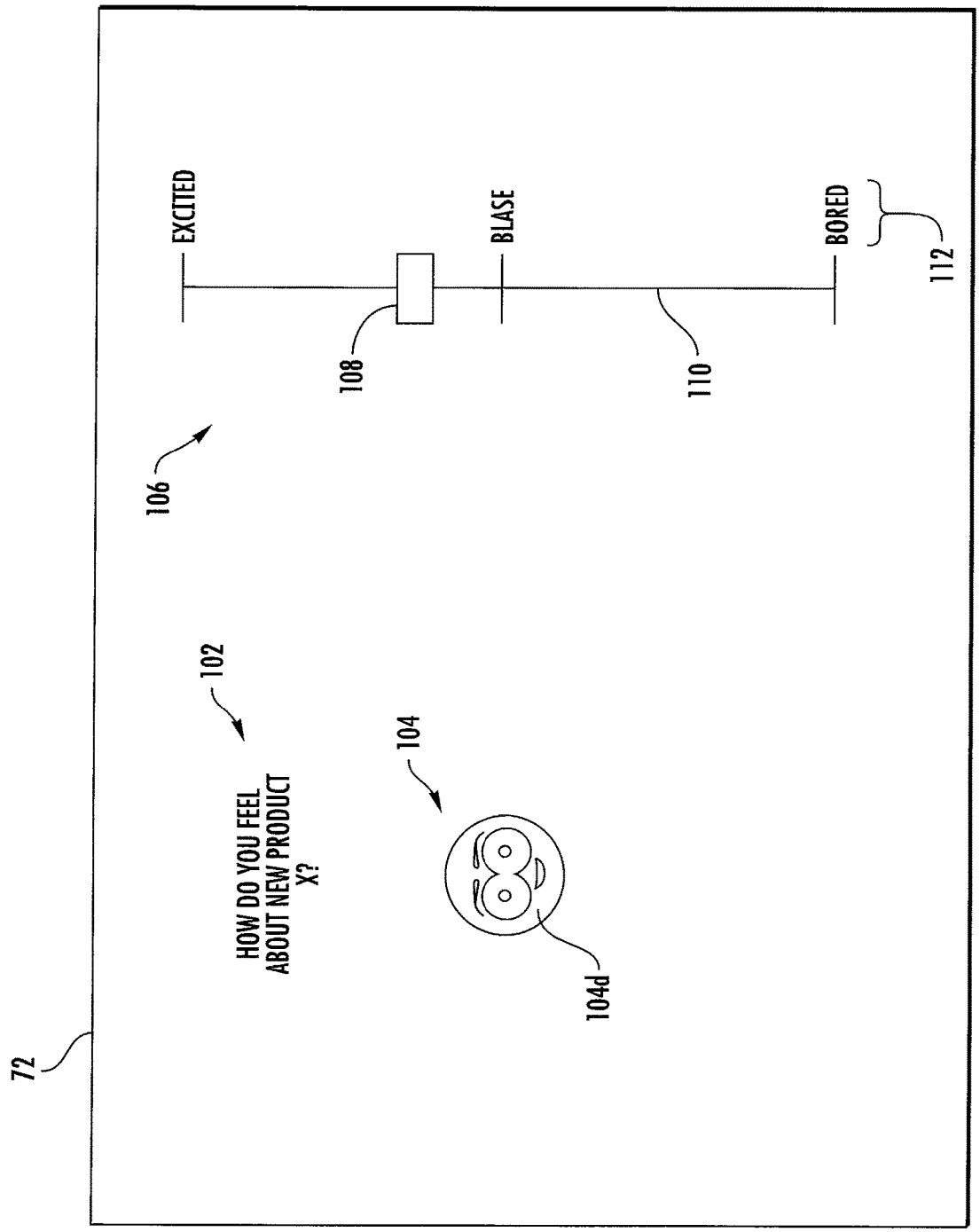
Figure 8:
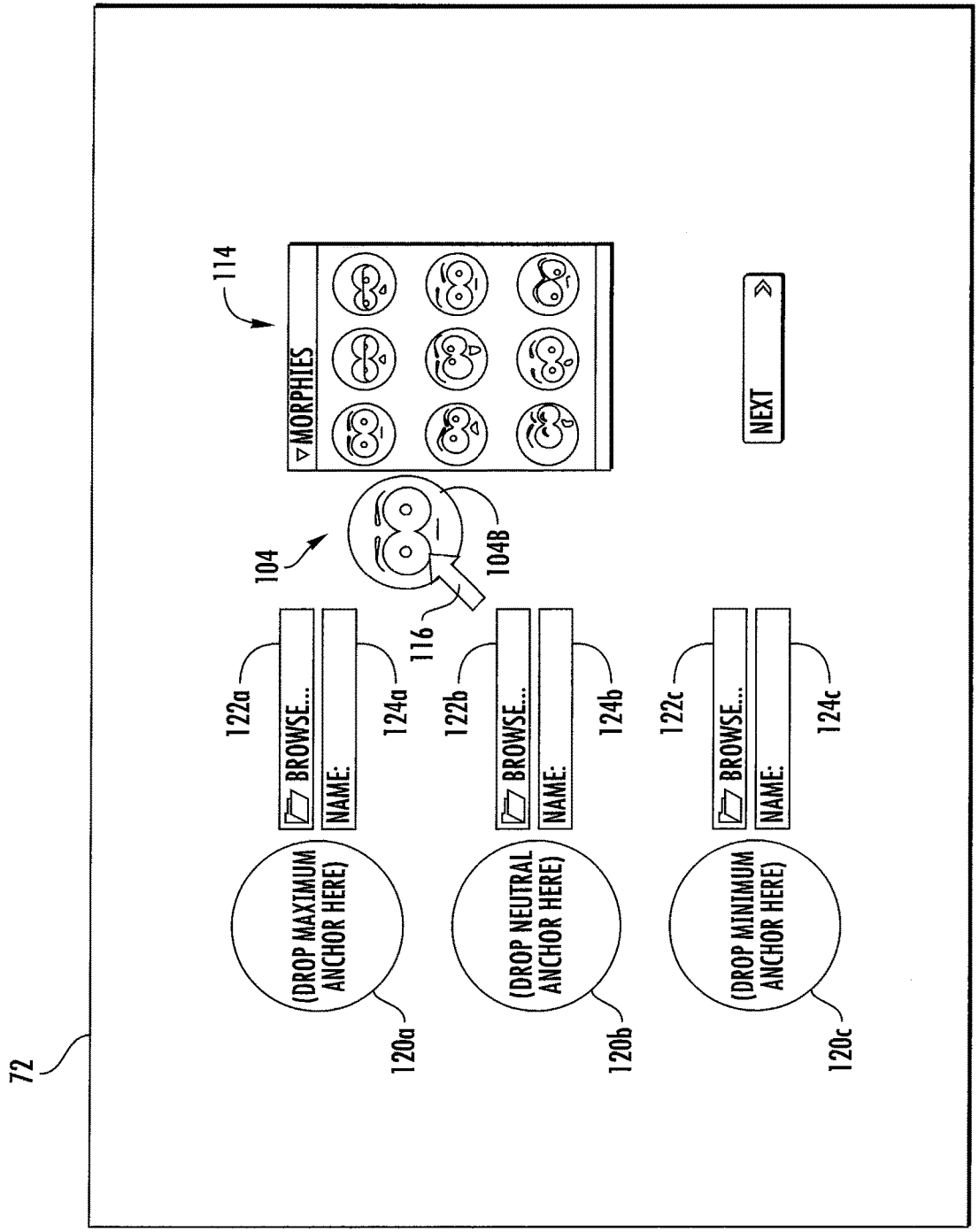
Figure 9:
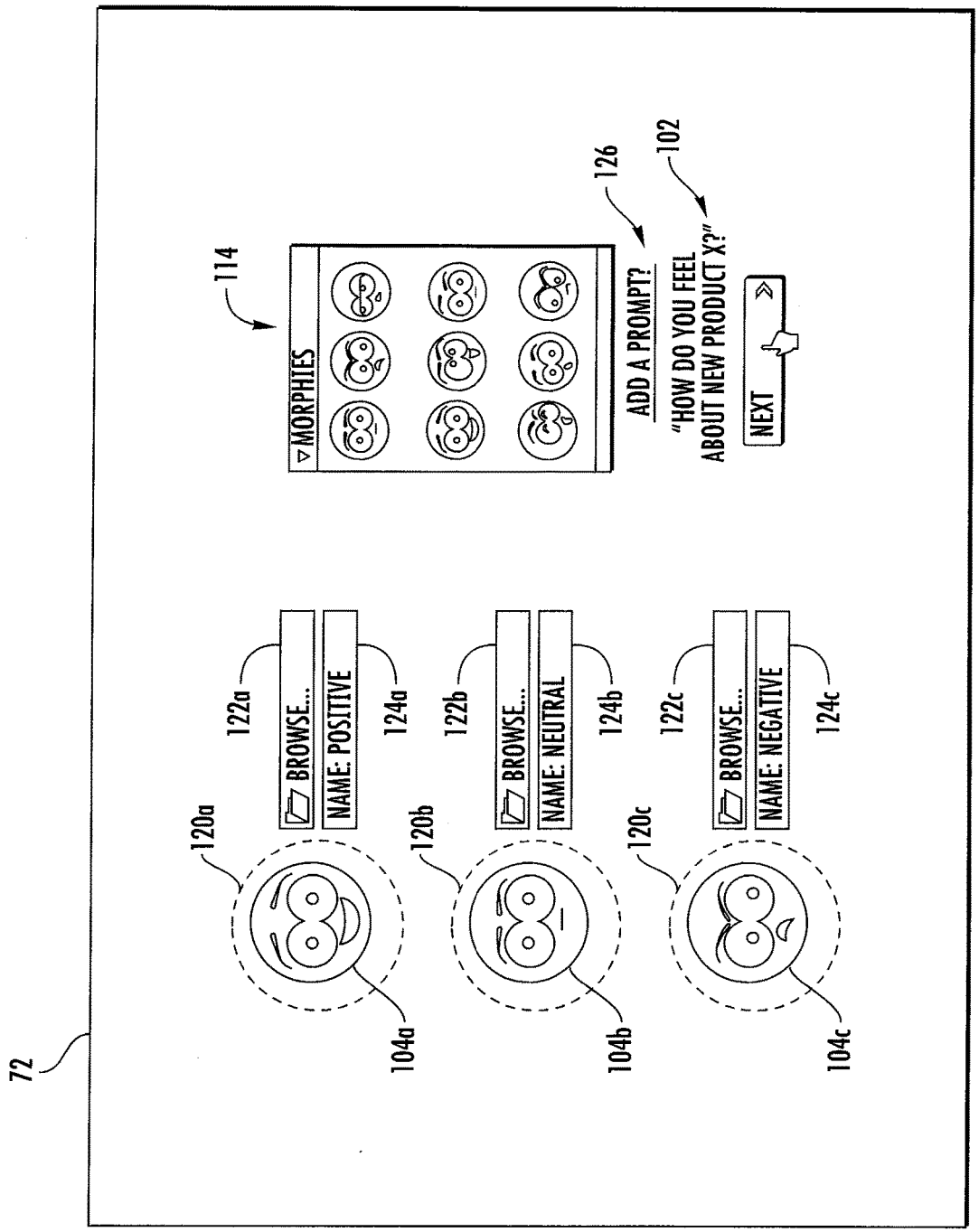
Figure 10:
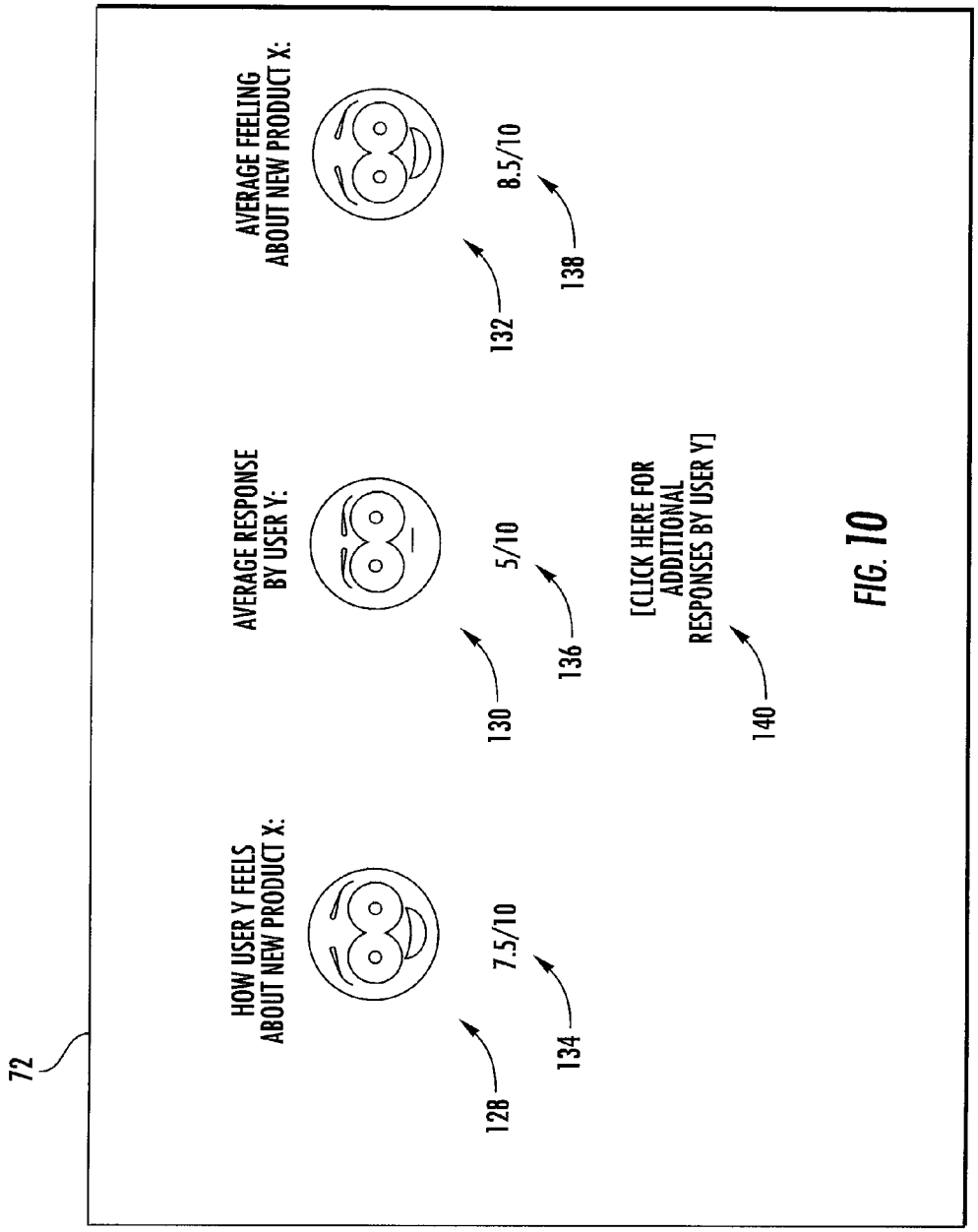
Figure 11:
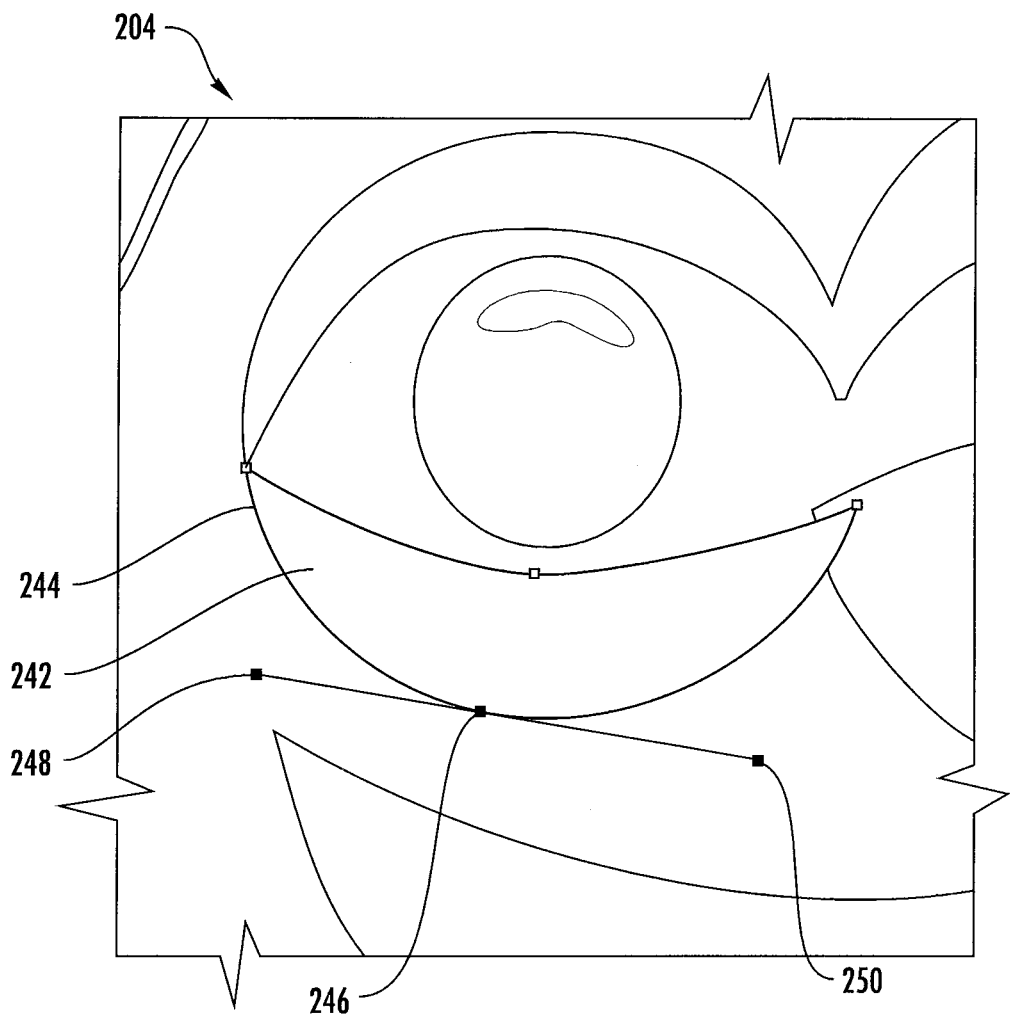
Figure 12:
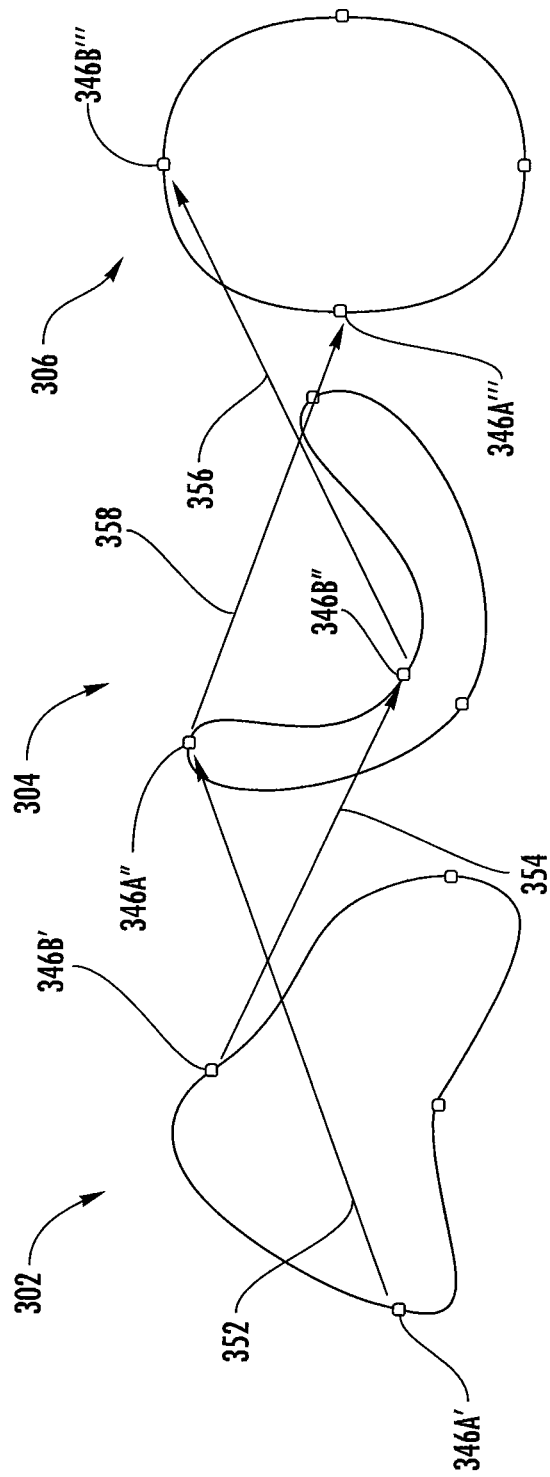
Figure 13:
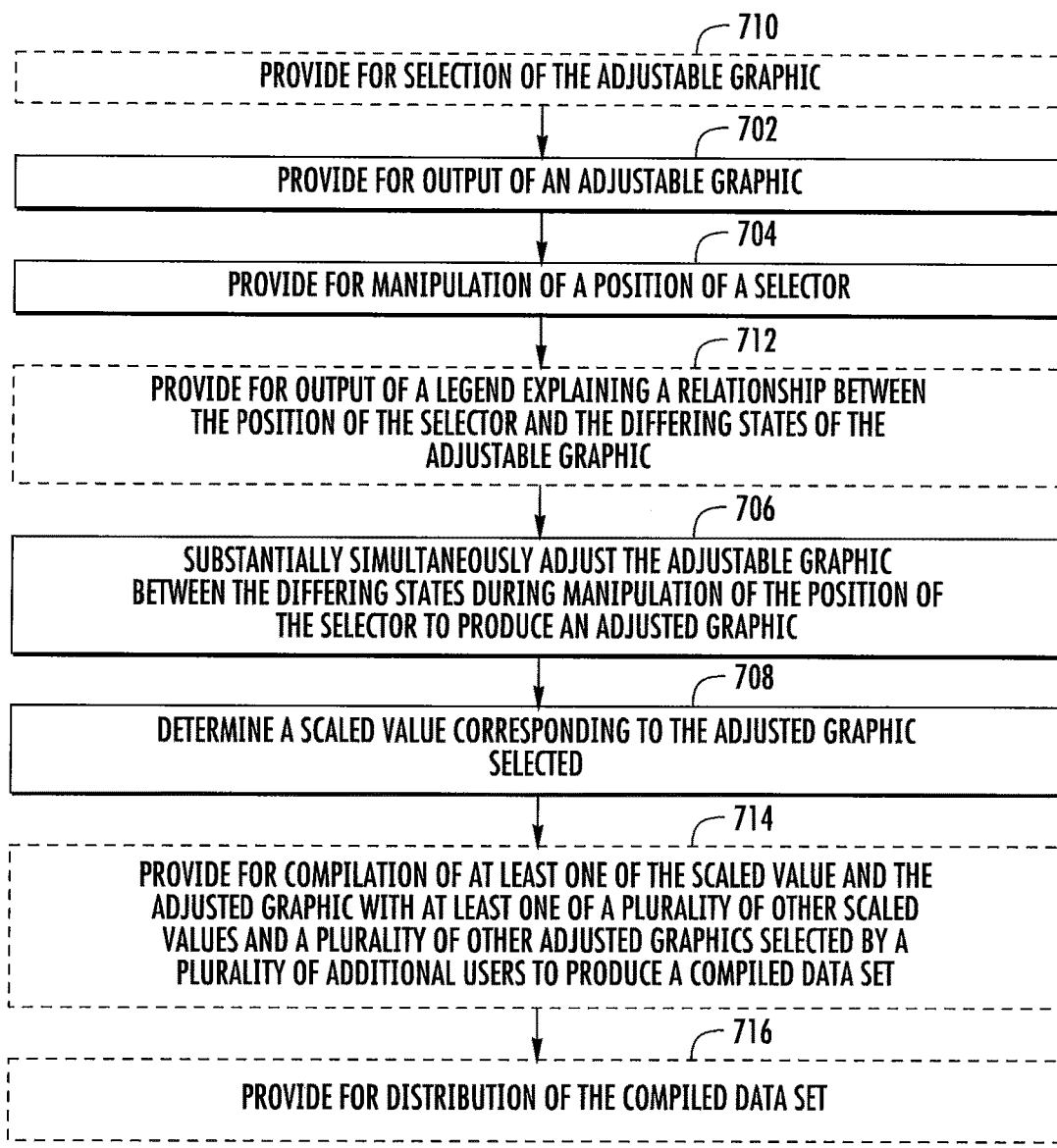

Having thus described the disclosure in general terms, reference will now be made to the accompanying drawings, which are not necessarily drawn to scale, and wherein:

FIG. 1 illustrates a schematic block diagram of a system according to an example embodiment of the present disclosure;

FIG. 2 illustrates a schematic block diagram of an apparatus configured to quantify a subjective experience according to an example embodiment of the present disclosure;

FIG. 3 illustrates a schematic block diagram of the apparatus of FIG. 2 including additional components configured to quantify a subjective experience according to an example embodiment of the present disclosure;

FIG. 4 illustrates a screenshot of a user interface showing an adjustable graphic and a selector in a first configuration in which the adjustable graphic defines a positive state according to one example embodiment of the present disclosure;

FIG. 5 illustrates a screenshot of the user interface of FIG. 4 showing the adjustable graphic and the selector in a second configuration in which the adjustable graphic defines a negative state according to one example embodiment of the present disclosure;

FIG. 6 illustrates a screenshot of the user interface of FIG. 4 showing the adjustable graphic and the selector in a third configuration in which the adjustable graphic defines a neutral state according to one example embodiment of the present disclosure;

FIG. 7 illustrates a screenshot of the user interface of FIG. 4 showing the adjustable graphic and the selector in a fourth configuration in which the adjustable graphic defines an intermediate state between the positive and neutral states according to one example embodiment of the present disclosure;

FIG. 8 illustrates a screenshot of a user interface during selection of an adjustable graphic to produce a survey for quantifying a subjective experience according to one example embodiment of the present disclosure;

FIG. 9 illustrates a screenshot of the user interface of FIG. 8 after selection of differing states of the adjustable graphic to produce a survey for quantifying a subjective experience according to one example embodiment of the present disclosure;

FIG. 10 illustrates a screenshot of a user interface illustrating compiled data quantifying subjective user experiences according to an example embodiment of the present disclosure;

FIG. 11 illustrates an enlarged view of a Bézier curve forming a portion of an additional embodiment of an adjustable graphic according to an example embodiment of the present disclosure;

FIG. 12 illustrates interpolation of points on Bézier curves between end states defined by static graphic images according to an example embodiment of the present disclosure; and FIG. 13 illustrates a flowchart of the operations performed in quantifying a subjective experience according to an example embodiment of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

As described herein, embodiments of the disclosure relate to systems, methods, apparatuses, and computer program products for quantifying subjective experiences. Subjective experiences, as used herein, refer to any experience a person (or even an animal) may undergo. In this regard, it may be valuable to quantify subjective experiences of an individual. Thereby, affects, feelings, moods, opinions, thoughts, sentiments, preferences, judgments, intentions, or any other measure of an experience may be quantified. By quantifying subjective experiences, the derived information may be more easily processed. In this regard, a scaled representation of a subjective experience allows for automated processing of the resulting information, comparison to other quantified subjective experiences, compilation of the quantified subjective experience with other quantified subjective experiences, and/or other uses as described hereinafter.

Collection of data with respect to a person's subjective experience may be valuable for a number of reasons. For example, knowledge of the amount of pain a person is suffering from may be helpful in determining the quantity and type of pain medication that should be prescribed to a patient. By way of further example, knowledge of a consumer's thoughts on a particular product he or she owns may be useful to other consumers in determining whether or not to purchase that product. Additionally, knowledge of a viewer's thoughts on a television show he or she viewed may be useful to a network airing the television show. Further, knowledge of a voter's views on a candidate may be useful to the candidate, his or her opponents, and the media. As may be understood, collection of data from various other types of subjective experiences may also be valuable.

Emoticons and other graphics have been employed in the past to express feelings and emotions. For example, U.S. Patent Application Publication No. 2012/0059787 by Brown et al. describes modifiable emoticons or avatars, but fails to disclose or suggest derivation of any data relating to the resulting emoticon or avatar. In other words, Brown et al. fail to recognize any value in quantifying the resulting emoticon or avatar. U.S. Patent Application Publication No. 2002/0149611 by May discloses an apparatus configured to receive input of data regarding a user's emotional response to a specified issue or property and corresponding changes to a corresponding graphical representation. However, the interface disclosed by May employs a set number of graphical representations from which a user may select, thereby limiting the accuracy of the quantification. U.S. Patent Application Publication No. 2008/0091635 by James et al. discloses morphing emoticons but discloses morphing based on the position of the emoticon on a sliding bar. By requiring a user to place a cursor over the emoticon, the user's view of the emoticon may be obstructed, which could make accurate selection of a representative emoticon difficult. Further, selection of a desired emoticon requires moving the emoticon, which further exacerbates the problem of accurate selection of a representative emoticon. Accordingly, embodiments of the disclosure provided herein are configured to avoid the problems noted above and provide further advances.

The systems, methods, apparatuses, and computer program products described herein may be embodied in a number of forms, and include a variety of functions. Accordingly, although various particular embodiments and functionalities are disclosed herein, it should be understood that this description is provided for example purposes only. In other embodiments the systems, methods, apparatuses, and computer program products may perform additional or fewer functions and/or be embodied in differing forms.

In this regard, by way of example, FIG. 1 illustrates a block diagram of a system that may benefit from embodiments of the present disclosure. It should be understood, however, that the system as illustrated and hereinafter described is merely illustrative of one system of the present disclosure and, therefore, should not be taken to limit the scope of embodiments of the present disclosure.

As shown in FIG. 1, a system in accordance with an example embodiment of the present disclosure may include a user terminal 10a. The user terminal 10a may be any of multiple types of stationary or mobile communication and/or computing devices, which employ an embodiment of the present disclosure. In some embodiments the user terminal 10a may be capable of communicating with other devices, either directly, or via a network 30 (e.g., a local network or the internet). In turn, other devices such as personal computers, server computers or the like may be included in or coupled to the network 30. By directly or indirectly connecting the user terminal 10a and the other devices to the network 30, the user terminal 10a and/or the other devices may be enabled to communicate with each other, to carry out various communication or other functions of the user terminal and the other devices, respectively. The user terminal 10a and the other devices may be configured to communicate with the network 30 and/or each other by any of numerous different access mechanisms.

The user terminal 10a may be configured to perform various functions with respect to quantifying a subjective experience, as described hereinafter. For example, the user may interact with a user interface of the user terminal 10a or other device, as described hereinafter, to adjust an adjustable graphic to reflect his or her subjective experience. The system may further include one or more additional user terminal(s) 10b. The additional user terminal(s) 10b may be configured to perform some or all of the functions performed by the user terminal 10a.

The system may further include a compilation and distribution server 40 in some embodiments. The compilation and distribution server 40 may be configured to perform various functions with respect to quantifying a subjective experience. For example, the compilation and distribution server 40 may be configured to provide for compilation of data from the user terminal 10a and the additional user terminal(s) 10b (collectively, "user terminals 10") to produce a compiled data set. Further, the compilation and distribution server 40 may provide for distribution of the compiled data set. Although referenced herein as a "server," the compilation and distribution server 40 may be embodied as a server, server bank or other computer, computing device, cloud, or node configured to compile and distribute data.

In example embodiments illustrated in FIGS. 2 and 3, an apparatus 50 is provided that may be employed by devices performing functions in accordance with example embodiments of the present disclosure. The apparatus 50 may be embodied, for example, as any device hosting, including, controlling, comprising, or otherwise forming a portion of the user terminal 10a, the user terminals 10b, and/or the compilation and distribution server 40. However, embodiments of the apparatus 50 may also be embodied on a plurality of other devices such as for example where instances of the apparatus may be embodied on the network 30. As such, embodiments of the apparatus 50 illustrated in FIGS. 2 and 3 are merely examples and may include more, or in some cases, less than the components shown in FIGS. 2 and 3.

With further regard to FIGS. 2 and 3, the apparatus 50 may be configured to quantify a subjective experience, as described in greater detail below. As depicted in FIG. 2, the apparatus 50 may include or otherwise be in communication with a processor 70, a user interface 72, and a memory device 76. The memory device 76 may include non-transitory and tangible memory that may be, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a user terminal or a fixed communication device or computing device such as a server configured to employ an example embodiment of the present disclosure. However, in some embodiments, the apparatus 50 may be physically embodied as a chip or chip set. The chip or chipset may constitute means for performing one or more operations for providing the functionalities described herein.

The processor 70 may be embodied in a number of different ways. For example, the processor 70 may be embodied as one or more of various processing means such as a coprocessor, a microprocessor, a controller, a digital signal processor (DSP), processing circuitry, or various other processing devices including integrated circuits such as, for example, a special-purpose computer chip, or other hardware processor. In an example embodiment, the processor 70 may be configured to execute instructions stored in the memory device 76 or otherwise accessible to the processor. Alternatively or additionally, the processor 70 may be configured to execute hard coded functionality. As such, the processor 70 may be capable of performing operations according to embodiments of the present disclosure while configured accordingly. Alternatively, when the processor 70 is embodied as an executor of software instructions, the instructions may specifically configure the processor to perform the operations described herein. The processor 70 may include a clock, an arithmetic logic unit (ALU) and logic gates configured to support operation of the processor, amongst other components.

The user interface 72 may be in communication with the processor 70 to receive an indication of a user input at the user interface and/or to provide an audible/visible, mechanical (e.g., haptic) or other output to the user. As such, the user interface 72 may include, for example, a keyboard, a mouse, a joystick, a display/monitor, a touch screen, a microphone, a speaker, a dial, and/or other input/output mechanisms. The processor 70 may be configured to control at least some functions of one or more elements of the user interface 72.

As mentioned above, embodiments of the apparatus 50 may include more, or in some cases less, than the components shown in FIG. 2. In this regard, FIG. 3 illustrates an embodiment of the apparatus 50 comprising additional components or modules configured to quantify a subjective experience and perform related functions as discussed in detail below. The apparatus 50 may include or otherwise be in communication with the processor 70, the user interface 72, and the memory device 76 as described above with respect to FIG. 2.

In some embodiments the apparatus 50 may further comprise a communication interface 74. The communication interface 74 may be any means such as a device or circuitry embodied in either hardware, software, or a combination thereof that is configured to receive and/or transmit data. In this regard, the communication interface 74 may include, for example, an antenna and supporting hardware and/or hardwired components and/or software.

In some embodiments the apparatus 50 may further comprise a visualization module 78. The visualization module 78 may be configured to perform one or more functions with respect to adjusting an adjustable graphic and performing related functions as described below in detail. In this regard, a user may adjust an adjustable graphic to correspond with a subjective experience. The processor 70 may be embodied as, include or otherwise control the visualization module 78.

In some embodiments the apparatus 50 may further comprise a quantification module 80. The quantification module 80 may be configured to perform one or more functions with respect to quantifying a scaled value corresponding to the adjusted graphic selected by a user and performing related functions as described below in detail. The processor 70 may be embodied as, include or otherwise control the quantification module 80.

In some embodiments the apparatus 50 may further comprise a compilation module 82. The compilation module 82 may be configured to perform one or more functions relating to providing for compilation of at least one of scaled values and adjusted graphics to produce a compiled data set and performing related functions for a single user or multiple users as described below in detail. The processor 70 may be embodied as, include or otherwise control the compilation module 82.

In some embodiments the apparatus 50 may further comprise a distribution module 84. The distribution module 84 may be configured to perform one or more functions with respect to providing for distribution of the compiled data set and performing related functions as described below in detail. The processor 70 may be embodied as, include or otherwise control the distribution module 84.

In some embodiments the apparatus 50 may further comprise a customization module 86. The customization module 86 may be configured to perform one or more functions relating to providing for selection of the adjustable graphic during the creation of a survey configured to quantify a subjective experience, and performing related functions as described below in detail. The processor 70 may be embodied as, include or otherwise control the customization module 86.

In one embodiment, the user interface 72 may be employed to allow a user to interact with the apparatus 50 to quantify a subjective experience. In this regard, FIG. 4 illustrates an example screenshot outputted by the user interface 72 when the apparatus 50 is seeking input from a user in order to quantify a subjective experience. In this regard, as illustrated in FIG. 4, in some embodiments the user interface 72 may display a prompt 102 requesting input with regard to a particular subjective experience.

In the illustrated embodiment, the prompt 102 requests input regarding the user's feelings with respect to "new product X." However, as may be understood, the prompt 102 may request input regarding any type of subjective experience including, for example, an economist's views with respect to the prospects for the economy, a voter's views with respect to a candidate, a viewer's or listener's thoughts on a program viewed or heard, a person's mental state, a person's level of pain, or sentiments with respect to any other subjective experience. Further, the prompt may seek input regarding, past, present, future (e.g., anticipated) subjective experiences. In this regard, the subjective experience may be recalled, ongoing at the time of the prompt (e.g., to quantity the subjective experience in real-time), anticipated, or even imagined (e.g., a hypothetical subjective experience). Thus, the subjective experience may pertain to a subject that is real, imagined, concrete (e.g., a product), or abstract (e.g., the concept of freedom). Further, the system described herein may be employed to allow a user to represent his or her estimation of the subjective experiences of other. For example, the prompt may request input with respect to how a user thinks the President will feel if a certain specific event occurs.

Accordingly, whereas existing embodiments of systems typically only prompts for input with respect to present thoughts on a subject, the system disclosed herein may more broadly seek input with respect to subjective experiences. Thus, for example, a user may be prompted to rate a subjective experience prospectively, in real-time, and after occurrence of a subjective experience. Thereby, the user's views with respect to the subjective experience before, during and after occurrence thereof may be compared to provide the user or another party with an understanding of how the user's views change over time.

Regardless of the particular prompt 102 employed, the system may provide for output of an adjustable graphic 104. The adjustable graphic 104 may be adjustable between at least two differing states, or valences. For example, FIG. 4 illustrates the adjustable graphic 104 as defining a positive expression 104*a*, whereas FIG. 5 illustrates the adjustable graphic 104 as defining a negative expression 104*c*. Optionally, the adjustable graphic 104 may define a third state between the other two differing states. In this regard, FIG. 6 illustrates the adjustable graphic 104 as defining a neutral state 104*b*. In some embodiments the adjustable graphics 104 may be continuously adjustable between the end states. For example, as described below, the adjusted graphics 104 may be defined by Bézier curves or other vectors that may be manipulated.

In order to adjust the adjustable graphic 104, the system may provide for manipulation of a selector. In the illustrated embodiment a selector 106 comprises a slider 108 on a track or scale 110. Accordingly, the user may adjust a position of the slider 108 on the scale 110 to thereby adjust the adjustable graphic between the at least two differing states. In this regard, FIG. 7 illustrates the slider 108 as defining a position on the scale 110 corresponding to an intermediate state 104*d* of the adjustable graphic 104 between the positive and neutral states 104*a,b*.

The system may provide for output of a legend 112 explaining a relationship between the position of the selector 106 (e.g., the position of the slider 108 on the scale 110 in the illustrated embodiment) and the differing states of the adjustable graphic 104. In the embodiment illustrated in FIGS. 4-7, the legend indicates that positions of the slider 108 on the upper half the scale correspond to the adjustable graphic 104 defining positive or neutral states, or intermediate states therebetween. Further, the legend indicates that positions of the slider 108 on the lower half of the scale correspond to the adjustable graphic 104 defining neutral or negative states, or intermediate states therebetween. Accordingly, a user may know in advance of manipulating the selector 106 how manipulation thereof will affect the graphical image 106.

The adjustable graphic 104 may remain stationary during manipulation of the selector 106. Accordingly, a position of the selector 106 may be independent of a position of the adjustable graphic 104. In this regard, although the characteristics of the adjustable graphic 104 are altered during movement of the slider 108, the position of the adjustable graphic does not change.

Applicants have determined that use of an adjustable graphic 104 that does not change position based on a position of the selector 106 may be desirable. More particularly, Applicants have determined that retaining the adjustable graphic 104 in a stationary position allows a user to treat the adjustable graphic 104 as a "mirror," such that he or she may more easily hone in on the appearance of the adjustable graphic that most closely corresponds to the user's response or sentiments regarding the subjective experience referenced in the prompt 102.

Further, embodiments may include additional features configured to allow a user to more accurately employ the adjustable graphic 104 to match his or her response to the prompt 102. In this regard, the adjustable graphic 104 may be continuously adjustable between the two or more differing states. Thus, for each position of the slider 108 along the scale 110, the adjustable graphic 104 may define a differing configuration corresponding thereto. Thereby, adjustment of the position of the slider 108 on the scale 110 may produce a substantially infinite number of differing configurations of the adjustable graphic 104 between the two or more differing states. Features allowing for substantially infinite adjustment of the adjustable graphic are discussed below in detail.

Applicants have further determined that substantially instantaneous adjustment of the adjustable graphic 104 in response to manipulation of the selector 106 may be desirable. Thus, as a user moves the slider 108 along the scale 110, the adjustable graphic 104 may simultaneously be adjusted in real-time. In this regard, by providing a user with substantially immediate change to the adjustable graphic 104 in response to movement of the slider 108 along the scale 110, a user may be able to more easily hone in on the adjusted graphic most closely corresponding to his or response to the prompt 102.

As noted above, in one embodiment the selector 106 may comprise a slider 108 on a scale 110. In this regard, by way of example, a user may employ a mouse or a touchpad to manipulate the position of the slider 108. Alternatively or additionally, the user interface 72 may comprise a touchscreen and thereby the user may touch the user interface to manipulate the position of the slider 108. Further, various other selectors may be employed in alternate embodiments. For example, a rotary dial may be employed to manipulate a selector, the position of the selector may be manipulated by voice commands, the position of the selector may be manipulated based on movement of the device (e.g., via movement detected by an accelerometer), or any other of various selectors and input mechanism may be employed. Additionally, in some embodiments the selector may not be displayed. Rather, by way of example, a user may swipe up-and-down, side-to-side, or in other directions (e.g., using a touchscreen) until the adjustable graphic corresponds to the user's response or sentiments regarding the subjective experience referenced in the prompt.

The data collected via adjustment of the adjustable graphic 104 may be employed to determine a scaled value correspond to the adjust graphic selected. In this regard, the position of the selector 106 may correspond to a numerical value between upper and lower values defined at the upper and lower ends of the scale 110. Thus, based on the position of the slider 108, a scaled value may correspond to the adjusted graphic selected by the user. Accordingly, the subjective experience may be quantified. In this regard, the at least two differing states may define a type of a response (e.g., a mood, emotion, feeling sentiment, opinion, preference, intention, etc.) whereas the scaled value between the at least two differing states may define a numerical representation of an intensity of the response.

In some embodiments the scaled value corresponding to the selected adjustable graphic may be shown to the user while he or she adjusts the adjustable graphic. However, in other embodiments the scaled value may not be displayed while the user manipulates the selector. Accordingly, a situation in which a user tries to directly quantify the subjective experience by matching the position of the slider 108 on the scale 110 to a specific numerical value may be avoided. Rather, Applicants have determined that forcing the user to match his or her subjective experience to an adjustable graphic may more accurately quantify the subjective experience.

In some embodiments the system may be customizable to allow for creation of customized surveys seeking input with respect to subjective experiences. In this regard, as may be understood, the embodiment of the survey illustrated in FIGS. 4-7 is only an example embodiment of a system requesting input regarding a subjective experience. Thus, FIG. 8 illustrates the user interface 72 during creation of a custom survey seeking input regarding a subjective experience.

As illustrated in FIG. 8, in some embodiments the system may provide for selection of the adjustable graphic 104. More particular, the system may provide for selection of at least two graphics respectively defining the at least two differing states. As discussed below, in some embodiments the graphics defining the at least two differing states may comprise vector graphics. In this regard, a user may select from a plurality of default graphical images 114. FIG. 8 illustrates use of a pointer 116 to drag and drop a selected graphic (e.g., the graphical image 104 defining the neutral state 104b, as illustrated in FIG. 8) into one of a plurality of anchor spaces 120a-c. In particular, the anchor spaces 120a-c may provide for selection of a maximum state 120a, a neutral state 120b, and a minimum state 120c in some embodiments. Thus, the user may select from the default graphical images 114 and place them in at least two of the anchor spaces 120a-c to define the at least two differing states. In some embodiments a user may alternatively or additionally be provided with the option to browse files to select desired graphical images. In this regard, as illustrated, a file selector 122a-c may be provided for each of the at least two differing states to allow for selecting of graphical images. A name box 124a-c may be associated with each of the at least two graphical images.

As illustrated in FIG. 9, each name box 124a-c may automatically populate upon selection of a graphical image via the default graphical images 114 or via the file selector 122a-c. For example, the file name associated with the selected graphical image may be displayed. In some embodiments the names included in each name box 124a-c may be editable to allow for customization of the name associated with each graphical image. In this regard, the names included in each name box 124a-c may be employed to populate the legend 112.

As further illustrated in FIG. 9, the system may include a prompt input 126. The prompt input 126 may optionally allow for entry of a prompt (e.g., the prompt 102) to be displayed in association with the adjustable graphic. Accordingly, in the manner described above, customized surveys may be created with respect to any of a variety of subjective experiences that allow a user to adjust an adjustable graphic between at least two states, as specified during the customized survey creation process described above.

The data collected regarding subjective experiences via the process described above may be employed for any of a variety of purposes. In some instances, the response of one individual at one point in time may be of interest. However, in other instances it may be desirable to compile data regarding multiple subjective experiences. In this regard, the system provided herein may provide for collection of data regarding a plurality of subjective experiences. For example, changes in one person's subjective experiences may be of interest, so data with respect to one particular user may be compiled over time. In other instances, data with respect to the subjective experiences of multiple users may be of interest. Thus, for example, polling in classrooms or boardrooms may be accomplished without specialized equipment. In this regard, the present system disclosed herein may be provided as software as a service (SaaS).

In one embodiment the system may provide for compilation of at least one of the scaled value and the adjusted graphic with at least one of a plurality of other scaled values and a plurality of other adjusted graphics (e.g., selected by a plurality of additional users) to produce a compiled data set. The system disclosed herein may further provide for distribution of the compiled data set. For example, the system may define a social exchange network in which subjective experiences, as quantified by adjustment of the adjustable graphic in the manner described above, are shared amongst users.

In this regard, by way of example, FIG. 10 illustrates the user interface 72 during output of compiled information regarding subjective experiences in relation to a certain prompt. Thus, for example, users may be able to view an adjusted graphic 128 quantifying a subjective experience by an individual user, an adjusted graphic 130 corresponding to that user's average subjective experience in relation to all prompts, and/or an adjusted graphic 132 corresponding to the overall average subjective experience by all users to the particular prompt. The scaled values 134, 136, 138 respectively corresponding to these adjusted graphics 128, 130, 132 may also be displayed. Further, in some embodiments a link 140 may be provided to view subjective experiences by a particular user in relation to other prompts. Thus, users may share their responses to certain prompts, and the resulting information may be employed for a variety of purposes.

In order to allow for direct comparisons of subjective experiences in the manner discussed above, predefined scales (e.g., predefined product rating scales) may be provided. For example, when rating a product, a user may select from one or more scales each representing a distinct sentiment. Adjustment of the adjustable graphic on the scale may thus allow for quantification within a range defining standardized maximum and minimum values. For example, a most intense setting may correspond to a value of "10", and a neutral setting may correspond to a value of "0." However, various other scales may be employed in other embodiments.

As noted above, the adjustability of adjustable graphics provides benefits in terms of quantifying a subjective experience. In order to provide continuously adjustable graphics that may be adjusted to define a substantially infinite number of intermediate states between the at least two differing states, the adjustable graphic may define certain features configured for these purposes. More particularly, the adjustable graphics may be configurable to be continuously manipulable, rather than defining stepped intervals between the two differing states. Accordingly, by using one of the techniques described herein, rather than use of a plurality of fixed intermediate graphics, a user may be provided with a substantially infinite number of variations of the adjustable graphic bounded by the at least two differing states such that he or she can more closely match his or her response to the prompt.

In one embodiment the adjustable graphic may comprise vector graphics, with each vector graphic defining one of the at least two differing states. The term vector graphic refers to the use of geometric primitives such as points, lines, curves, and shapes or polygon(s), which are based on mathematical expressions, to represent images in computer graphics. Vector graphics are comprised of paths (e.g., vectors), which are defined by a start and end point, along with other points, curves, and/or angles. Example embodiments of vectors include Bézier curves, lines, polylines, polygons, bezigons, circles, and ellipses. One or more vectors may be concatenated to define each element of the adjustable graphic. For example, the elements of the adjustable graphics 104 illustrated in FIGS. 4-10 include eye whites, eyebrows, pupils, and a mouth positioned on a head, and each of these elements is formed by one or more vectors. In one embodiment the vector graphics may comprise scalable vector graphic (.svg) files. Scalable vector graphic files are XML-based (extensible markup language-based) two-dimensional vector graphics that include support for interactivity and animation. However, other file formats may be employed in other embodiments.

Although the adjustable graphic comprises a cartoon representation of a face in the illustrated embodiment, various other adjustable graphics may be employed. In this regard, in some embodiments the adjustable graphics may be particularly configured to assist a user in visualizing emotions, feelings, or otherwise representing any subjective experience. Cartoons may be preferable to realistic avatars for allowing a user to visualize a representation of a subjective experience. Further, the elements of the adjustable graphics may comprise geons. Geons are simple two or three dimensional forms such as cylinders, bricks, wedges, cones, circles and rectangles corresponding to the simple parts of an object, as described by Irving Biederman's recognition-by-components theory. Thus, geons may be employed to represent features of facial expressions. The geons may be formed by vectors, as described above and hereinafter, to allow for adjustment thereof. Note that although use of cartoons, and in particular cartoons employing geons may be preferable, in other embodiments various other types of adjustable graphics may be employed. In this regard, any vector graphics may define the at least two differing states of the adjustable graphic by employing the techniques described herein.

The vectors of the vector graphics may comprise Bézier curves in some embodiments, as noted above. Thus, each element of the adjustable graphic may be defined by one or more Bézier curves or other vector(s). For example, in one embodiment each element of the adjustable graphic comprises four cubic Bézier curves that are linked together. As discussed below, Bézier curves are parametric curves used to model smooth curves that can be infinitely manipulated. However, a greater or lesser number of Bézier curves having a greater or lesser number of polynomial degrees may be employed in other embodiments. Each Bézier curve may comprise an anchor point and control points (e.g., two control points) each respectively defining a horizontal and vertical position (x and y coordinates).

For example, FIG. 11 illustrates an enlarged view of an additional embodiment of an adjustable graphic 204 including an eyelid 242. As illustrated, the eyelid 242 is defined by a Bézier curve 244. Further, an anchor point 246, a first control point 248, and a second control point 250 of the Bézier curve 244 are also shown. Thus, as described above, Bézier curves (or other vectors) may define elements such as the eyelid 242 of the adjustable graphic 204.

Existing tools allow for rotating, scaling, translating (e.g., across a horizontal or vertical axis), and skewing vector graphics. However, these tools act on the shape as a whole. In order to provide for substantially infinite adjustment of adjustable graphics between differing states, Applicants herein provide a method for manipulating anchor and control points of vectors (e.g., Bézier curves) to act on the vectors individually, as opposed to acting on elements formed by such vectors as a whole. As noted above, the differing states between which the adjustable graphic may manipulated may be defined by two or more vector graphics.

As noted above, existing tools for manipulating vector graphics act on the vector as a whole, which may not allow for manipulation of a graphic between vector graphics defining differing states. In this regard, the method for individually manipulating anchor and control points of vectors provided herein allows for adjustment between any plurality of vector graphics defining the differing states. In other words, the method may be conducted to allow for adjustment between differing states defined by vector graphics with very little customization of the method required, regardless of the particular shapes of the vector graphics. In this regard, the only customization required to carry out the method provided herein is linking the points defining the vectors between the two differing states, as discussed below.

For example, FIG. 12 illustrates a first vector graphic 302, a second vector graphic 304, and a third vector graphic 306, which may define three differing states of an adjustable graphic. Further, FIG. 12 illustrates a first anchor point 346A', 346A", 346A''' and a second anchor point 346B', 346B", 346B''' respectively associated with vectors (e.g., Bézier curves) defining the vector graphics 302, 304, 306. Additionally, FIG. 12 illustrates how the anchor points are linked to one another.

In this regard, arrow 352 illustrates a link between the first anchor point 346A' of the first vector graphic 302 and the first anchor point 346A" of the second vector graphic 304. Further, arrow 354 illustrates a link between the second anchor point 346B' of the first vector graphic 302 and the second anchor point 346B" of the second vector graphic 304. Thus, adjustment of the adjustable graphic between the first vector graphic 302 and the second shape 304 may occur by interpolation of the position of the first and second anchor points between the respective positions of the first anchor points 346A', 346A" and the second anchor points 346B', 346B" of the first vector graphic and the second vector graphic. In other words, the position of the anchor points may be substantially infinitely adjusted between the position of the anchor points of the first vector graphic 302 and the second vector graphic 304. Control points may be adjusted in the same manner, with each control point of the respective vector graphic linked to a control point of an additional vector graphic defining a differing state.

Arrows 356, 358 similarly, respectively illustrate the linking between the first anchor points 346A", 346A''' and the second anchor points 346B", 346B''' of the second vector graphic 304 and the third vector graphic 306. Accordingly adjustment of the adjustable graphic between the second vector graphic 304 and the third vector graphic 306 may occur in the same manner by interpolating the position of linked anchor and control points as described above. Further, as described above, each vector graphic 302, 304, 306 defining an end state may be assigned a name and/or a numeric value to add context to the manipulation of the adjustable graphic. By assigning a numeric value to each vector graphic defining a differing state, a scale defining a dynamic visualization of input values may be provided.

Note that although adjustment of adjustable graphics is generally described herein as being employed for quantifying a subjective experience, the techniques for substantially infinite adjustment of vector graphics between differing states and quantification of a states therebetween may be employed for various other purposes. In this regard, by way of example, the techniques disclosed herein may be used to show cloud development and movement depicted on a radar image between differing detected and/or predicted states. By way of further example, the techniques disclosed herein may be used to show cell migrations during prenatal development from known positions in a neural tube to known positions in eventual brain structures (e.g., the hippocampus, the brain stem, and the cerebellum). In this regard, manipulation of vector graphics (e.g., Bézier curves) via interpolation of individual control and anchor points may allow for substantially infinite adjustment of vector graphics between differing end states and quantification of the particular states between and at the end states which provides advantages as compared to techniques involving other methods for adjusting graphics as disclosed above.

FIG. 13 is a flowchart of a system, method and program product according to an example embodiment. Each block of the flowchart, and combinations of blocks in the flowchart, may be implemented by various means, such as hardware, firmware, processor, circuitry and/or other devices associated with execution of software including one or more computer program instructions. These devices may be specially configured to perform the specified functions. Further, these computer program instructions may be stored in a computer-readable storage medium which, when executed, implement the functions specified in the flowchart block(s). As used herein, a computer-readable storage medium refers to a non-transitory, physical storage medium (e.g., a volatile or non-volatile memory device) and can be differentiated from an electromagnetic signal.

In this regard, one embodiment of a method for quantifying a subjective experience may include providing for output of an adjustable graphic at operation 702. In some embodiments the adjustable graphic may be continuously adjustable between at least two differing states. Further, the method may include providing for manipulation of a position of a selector at operation 704. In some embodiments the position of the selector may be independent of a position of the adjustable graphic. The method may also include substantially simultaneously adjusting the adjustable graphic between the differing states during manipulation of the position of the selector to produce an adjusted graphic at operation 706. In some embodiments adjusting the adjustable graphic at operation 706 may comprise manipulating a vector such as a Bézier curve. Additionally, the method may include determining a scaled value corresponding to the adjusted graphic selected at operation 708.

In some embodiments, certain ones of the above-described operations (as illustrated in solid lines in FIG. 13) may be modified or added onto. In some embodiments additional operations may also be included (some examples of which are shown in dashed lines in FIG. 13). It should be appreciated that each of the modifications and/or optional additions may be included with the above-described operations (702-708) either alone or in combination with any other operations described herein.

For example, the method may further include providing for selection of the adjustable graphic at operation 710. Providing for selection of the adjustable graphic at operation 710 may comprise providing for selection of at least two vector graphics defining the at least two differing states. The method may further comprise providing for output of a legend explaining a relationship between the position of the selector and the differing states of the adjustable graphic at operation 712. Additionally, the method may include providing for compilation of at least one of the scaled value and the adjusted graphic with at least one of a plurality of other scaled values and a plurality of other adjusted graphics selected by a plurality of additional users to produce a compiled data set at operation 714. The method may further comprise providing for distribution of the compiled data set at operation 716.

In an example embodiment, an apparatus for performing the method of FIG. 13 and other methods described above may comprise a processor (for example, the processor 70) configured to perform some or each of the operations (702-716) described above. The processor may, for example, be configured to perform the operations (702-716). Alternatively, the apparatus may comprise means for performing each of the operations described above. In this regard, according to an example embodiment, examples of means for performing operations 700-716 may comprise, for example, the processor 70, the user interface 72, the communication interface 74, the visualization module 78, the quantification module 80, the compilation module 82, the distribution module 84, and the customization module 86, as described above.

In some embodiments the operation 702 of providing for output of an adjustable graphic, the adjustable graphic being continuously adjustable between at least two differing states may be conducted by means, such as the user interface 72, the visualization module 78, and/or the processor 70. Additionally, the operation 704 of providing for manipulation of a position of a selector, the position of the selector being independent of a position of the adjustable graphic may be conducted by means, such as the user interface 72, the visualization module 78, and/or the processor 70. Also, the operation 706 of substantially simultaneously adjusting the adjustable graphic between the differing states during manipulation of the position of the selector to produce an adjusted graphic may be conducted by means, such as the user interface 72, the visualization module 78, and/or the processor 70. Additionally, the operation 708 of determining a scaled value corresponding to the adjusted graphic selected may be conducted by means, such as the quantification module 80 and/or the processor 70.

Further, providing for selection of the adjustable graphic at operation 710 may be conducted by means, such as customization module 86 and/or the processor 70. Additionally, the operation 712 of providing for output of a legend explaining a relationship between the position of the selector and the differing states of the adjustable graphic may be conducted by means, such as the user interface 72, the visualization module, and/or the processor 70. Additionally, the operation 714 of providing for compilation of at least one of the scaled value and the adjusted graphic with at least one of a plurality of other scaled values and a plurality of other adjusted graphics selected by a plurality of additional users to produce a compiled data set may be conducted by means, such as communication interface 74, the compilation module 84, and/or the processor 70. Also, the operation 716 of providing for distribution of the compiled data set may be conducted by means, such as the communication interface 74, the distribution module 84, the compilation module 86, and/or the processor 70.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A method for quantifying a subjective experience, comprising:
   providing for output of an adjustable vector graphic, the adjustable vector graphic comprising a plurality of vector paths each including an anchor point and control points and being continuously adjustable between at least two differing predefined states;
   providing for manipulation of a position of a selector, the position of the selector being independent of a position of the adjustable vector graphic;
   substantially simultaneously automatically adjusting the adjustable vector graphic between the differing states during and in response to manipulation of the position of the selector to produce an adjusted vector graphic via a processor, wherein adjustment of the adjustable vector graphic comprises concurrently adjusting each of the anchor point and the control points of an individual vector path of the adjustable vector graphic to a different position between the differing states of the adjustable vector graphic, each of the concurrent adjustments of the anchor point and control points of the individual vector path being independent of the concurrent adjustments of the anchor point and the control points of any other vector paths of the adjustable vector graphic; and
   determining a scaled value corresponding to the adjusted vector graphic selected.

2. The method of claim 1, further comprising providing for selection of the adjustable vector graphic.

3. The method of claim 1, further comprising providing for compilation of at least one of the scaled value and the adjusted vector graphic with at least one of a plurality of other scaled values and a plurality of other adjusted vector graphics selected by a plurality of additional users to produce a compiled data set.

4. The method of claim 3, further comprising providing for distribution of the compiled data set.

5. The method of claim 1, further comprising providing for output of a prompt requesting a response.

6. The method of claim 5, wherein each of the textual indicators defines a differing response to the prompt.

7. The method of claim 1, further comprising providing for output of a legend explaining a relationship between the position of the selector and each of the differing predefined states of the adjustable vector graphic, the legend including a plurality of textual indicators respectively corresponding to and describing one of the differing predefined states, wherein the scaled value corresponding to the adjusted vector graphic selected is not displayed to a user manipulating the position of the selector.

8. The method of claim 1, further comprising providing for selection of the at least two differing predefined states by selecting a first vector graphic comprising a plurality of first vector paths including an anchor point and control points and a second vector graphic comprising a plurality of second vector paths including an anchor point and control points,
the selector being adjustable between a first limit and a second limit,
the adjustable vector graphic comprising the first vector graphic at the first limit of the selector,
the adjustable vector graphic comprising the second vector graphic at the second limit of the selector,
the anchor point and control points of the first vector paths being linked to the anchor point and control points of the second vector paths such that the anchor point and control points of the vector paths of the adjustable vector graphic are individually interpolated between the anchor point and control points of the first vector paths and the anchor point and control points of the second vector paths at positions of the selector between the first limit and the second limit.

9. An apparatus comprising at least one processor and at least one memory device including computer program code, the at least one memory device and the computer program code configured to, with the processor, cause the apparatus to:
provide for output of an adjustable vector graphic, the adjustable vector graphic comprising a plurality of vector paths each including an anchor point and control points and being continuously adjustable between at least two differing predefined states;
provide for manipulation of a position of a selector, the position of the selector being independent of a position of the adjustable vector graphic;
substantially simultaneously automatically adjust the adjustable vector graphic between the differing states during and in response to manipulation of the position of the selector to produce an adjusted vector graphic, wherein adjustment of the adjustable vector graphic comprises concurrently adjusting each of the anchor point and the control points of an individual vector path of the adjustable vector graphic to a different position between the differing states of the adjustable vector graphic, each of the concurrent adjustments of the anchor point and control points of the individual vector path being independent of the concurrent adjustments of the anchor point and the control points of any other vector paths of the adjustable vector graphic; and
determine a scaled value corresponding to the adjusted vector graphic selected.

10. The apparatus of claim 9, further configured to provide for selection of the adjustable vector graphic.

11. The apparatus of claim 9, further configured to provide for compilation of at least one of the scaled value and the adjusted vector graphic with at least one of a plurality of other scaled values and a plurality of other adjusted vector graphics selected by a plurality of additional users to produce a compiled data set.

12. The apparatus of claim 11, further configured to provide for distribution of the compiled data set.

13. The apparatus of claim 9, further configured to provide for output of a prompt requesting a response.

14. The apparatus of claim 13, wherein each of the textual indicators defines a differing response to the prompt.

15. The apparatus of claim 9, further configured to provide for output of a legend explaining a relationship between the position of the selector and each of the differing predefined states of the adjustable vector graphic, the legend including a plurality of textual indicators respectively corresponding to and describing one of the differing predefined states;
wherein the scaled value corresponding to the adjusted vector graphic selected is not displayed to a user manipulating the position of the selector.

16. The apparatus of claim 9, further configured to provide for selection of the at least two differing predefined states by selecting a first vector graphic comprising a plurality of first vector paths including an anchor point and control points and a second vector graphic comprising a plurality of second vector paths including an anchor point and control points,
the selector being adjustable between a first limit and a second limit,
the adjustable vector graphic comprising the first vector graphic at the first limit of the selector,
the adjustable vector graphic comprising the second vector graphic at the second limit of the selector,
the anchor point and control points of the first vector paths being linked to the anchor point and control points of the second vector paths such that the anchor point and control points of the vector paths of the adjustable vector graphic are individually interpolated between the anchor point and control points of the first vector paths and the anchor point and control points of the second vector paths at positions of the selector between the first limit and the second limit.

17. A computer program product comprising at least one computer-readable storage medium having computer-executable program code portions stored therein, the computer-executable program code portions comprising:
program code instructions providing for output of an adjustable vector graphic, the adjustable vector graphic comprising a plurality of vector paths each including an anchor point and control points and being continuously adjustable between at least two differing predefined states;
program code instructions providing for manipulation of a position of a selector, the position of the selector being independent of a position of the adjustable vector graphic;
program code instructions for substantially simultaneously automatically adjusting the adjustable vector graphic between the differing states during and in response to manipulation of the position of the selector to produce an adjusted vector graphic, wherein adjustment of the adjustable vector graphic comprises concurrently adjusting each of the anchor point and the control points of an individual vector path of the adjustable vector graphic to a different position between the differing states of the adjustable vector graphic, each of the concurrent adjustments of the anchor point and control points of the individual vector path being independent of the concurrent adjustments of the anchor point and the control points of any other vector paths of the adjustable vector graphic; and
program code instructions for determining a scaled value corresponding to the adjusted vector graphic selected.

18. The computer program product of claim 17, further comprising program code instructions providing for selection of the adjustable vector graphic.

19. The computer program product of claim 17, further comprising program code instructions providing for compilation of at least one of the scaled value and the adjusted vector graphic with at least one of a plurality of other scaled values and a plurality of other adjusted vector graphics selected by a plurality of additional users to produce a compiled data set.

20. The computer program product of claim 19, further comprising program code instructions providing for distribution of the compiled data set.

21. The computer program product of claim 17, further comprising program code instructions providing for output of a prompt requesting a response.

22. The computer program product of claim 21, wherein each of the textual indicators defines a differing response to the prompt.

23. The computer program product of claim 17, further comprising program code instructions providing for output of a legend explaining a relationship between the position of the selector and each of the differing predefined states of the adjustable vector graphic, the legend including a plurality of textual indicators respectively corresponding to and describing one of the differing predefined states, wherein the scaled value corresponding to the adjusted vector graphic selected is not displayed to a user manipulating the position of the selector.

24. The computer program product of claim 17, further comprising program code instructions providing for selection of the at least two differing predefined states by selecting a first vector graphic comprising a plurality of first vector paths including an anchor point and control points and a second vector graphic comprising an anchor point and control paths including a plurality of second points, the selector being adjustable between a first limit and a second limit, the adjustable vector graphic comprising the first vector graphic at the first limit of the selector, the adjustable vector graphic comprising the second vector graphic at the second limit of the selector, the anchor point and control points of the first vector paths being linked to the anchor point and control points of the second vector paths such that the anchor point and control points of the vector paths of the adjustable vector graphic are individually interpolated between the anchor point and control points of the first vector paths and the anchor point and control points of the second vector paths at positions of the selector between the first limit and the second limit.

* * * * *